(No Model.) 2 Sheets—Sheet 1.
E. PAIT.
COAL DUST FEEDER.
No. 414,322. Patented Nov. 5, 1889.
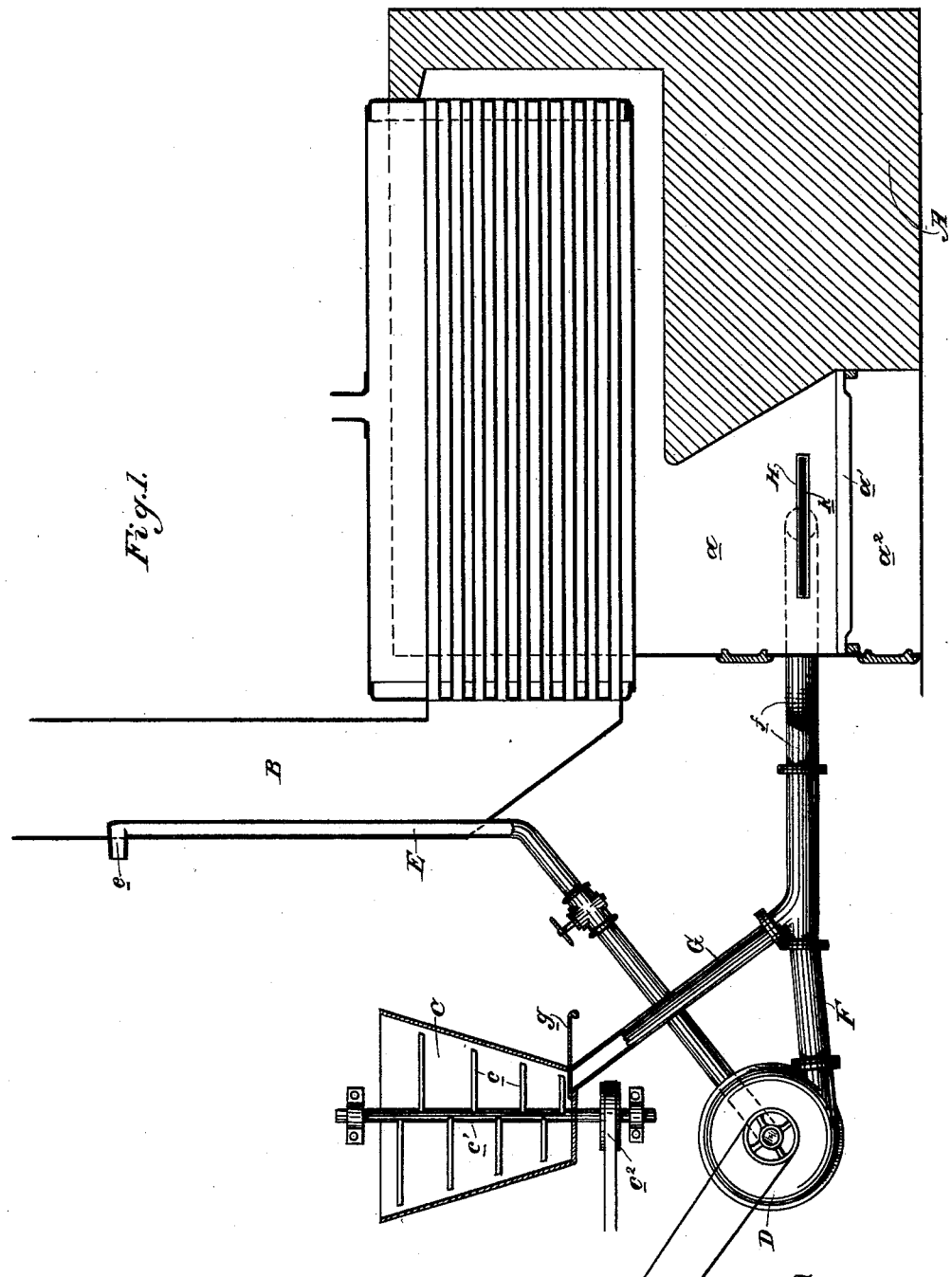
Witnesses:
J. H. Nurse
H. C. Lee.
Inventor,
Edmond Pait
By Durey & Co.
Attys

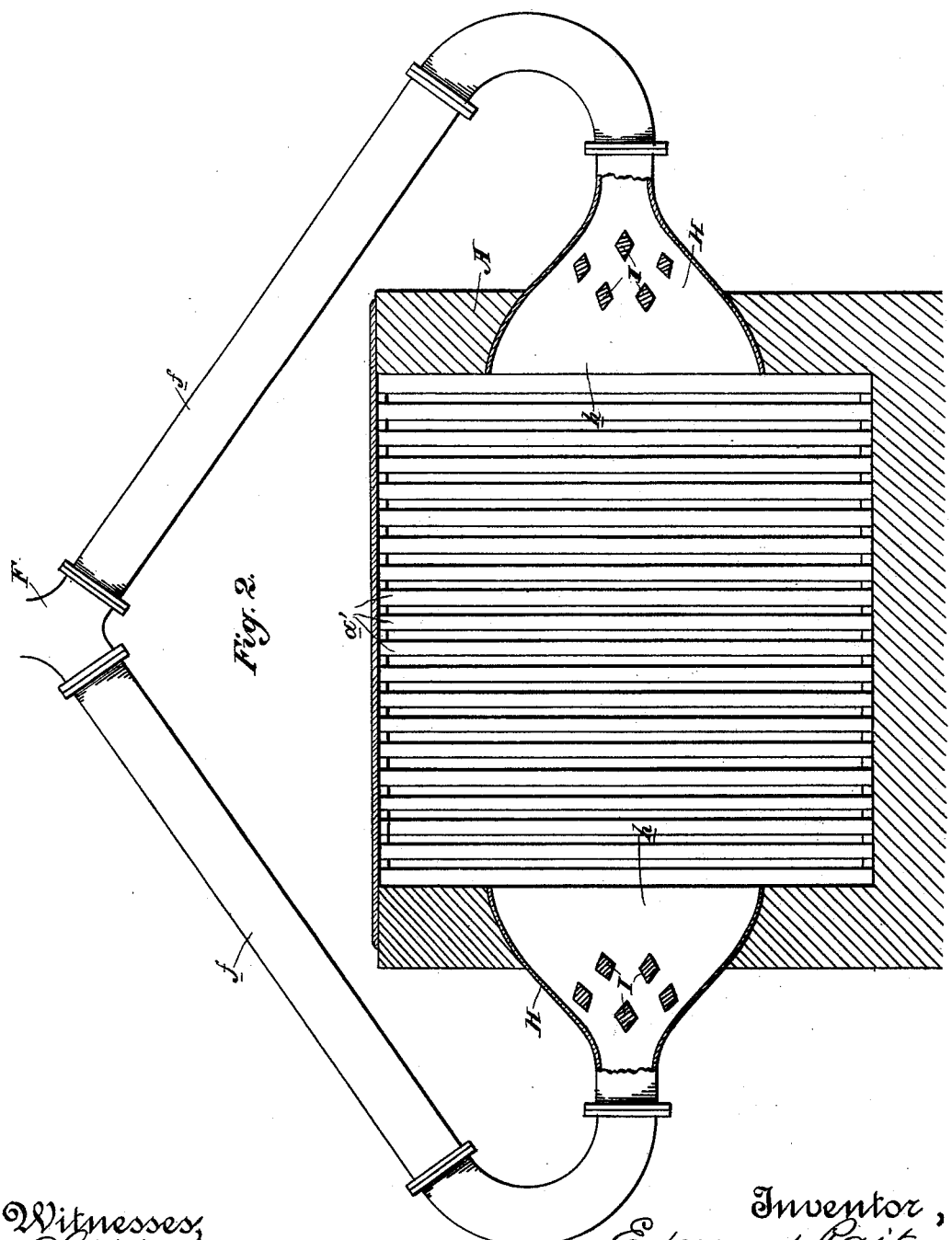

UNITED STATES PATENT OFFICE.

EDMOND PAIT, OF BERKELEY, ASSIGNOR OF TWO-FIFTHS TO BENJAMIN C. TURNER, OF SAN FRANCISCO, CALIFORNIA.

COAL-DUST FEEDER.

SPECIFICATION forming part of Letters Patent No. 414,322, dated November 5, 1889.

Application filed July 1, 1889. Serial No. 316,257. (No model.)

*To all whom it may concern:*

Be it known that I, EDMOND PAIT, of Berkeley, Alameda county, State of California, have invented an Improvement in Coal-Dust Feeders for Furnaces; and I hereby declare the following to be a full, clear, and exact description of the same.

My invention relates to the class of fuel-feeders for furnaces; and my invention consists in the constructions and combinations of devices which I shall hereinafter fully describe and claim.

Referring to the accompanying drawings for a more complete explanation of my invention, Figure 1 is a side elevation and part section of my feeder, showing its application to a furnace. Fig. 2 is a plan showing the communication of the branches $f$ and nozzles H with the fire-box of the furnace.

A is the furnace, of which $a$ is the fire-box, $a'$ the grate, and $a^2$ the ash-pit.

B is the smoke-stack of the furnace.

C is a receptacle, here shown in the form of a hopper, and designed for containing the powdered coal or dust. Within this receptacle operate the revolving arms $c$, driven by a shaft $c'$, to which they are attached, said shaft being rotated by means of the pulley $c^2$ and belt connection, unnecessary herein to show.

D is a fan-blower, and E is its inlet-pipe, said pipe extending through a portion of its length into the smoke-stack B of the furnace, and opening out at $e$ to the outer air.

F is the discharge-pipe from the fan-blower, and G is a pipe-connection between the hopper or receptacle C and said discharge-pipe, said communicating pipe being controlled by a gate $g$. The discharge-pipe F is divided into two branches $f$, one of which passes on one side of the fire-box wall and the other passes on the other side. To the ends of these branches are secured the nozzles H, which are made of two separated plates having a flaring or fan shape, as shown, and an elongated opening $h$ at their fronts. These nozzles are fitted into or built in the fire-box walls on each side, and their inner ends are just flush with the inner surfaces of said walls. Between the separated plates of these nozzles and near their entrances are the inclined-sided distributing-pieces I, the object of which is to properly distribute and equalize the incoming blast of material over the entire length of the nozzle, so that it shall be driven into the fire-chamber equally.

The fan-blower is driven by any suitable power, unnecessary herein to show.

The operation of the feeder is as follows: The coal, having been previously pulverized, is deposited in the hopper or receptacle C, and by the action of the stirrers within the receptacle is fed positively into communicating pipe G. The blower draws in air through the inlet-pipe E, and said air, passing through a portion of its course within the smoke-stack, is thereby heated, and, being driven out through the discharge-pipe of the blower, creates a suction in the communicating pipe G, and carries the powdered coal or dust with it through the discharge-pipe and the branches $f$ thereof and into the nozzles, by which it is discharged into the fire-box from each side. Here the heavier particles, dropping on the grate-bars, soon accumulate and keep the fire alive, while the dust, igniting at once, furnishes the necessary heat for the boiler. After steam is first gotten up, which can be done readily and quickly with this device, the operation is continuous.

Having thus described my invention, what I claim as new, and desire to secure by Letters Patent, is—

1. A coal-dust feeder for furnaces, consisting of the combination of the receptacle for the coal-dust, the fan-blower, the air-inlet pipe passing for a portion of its length into the smoke-stack of the furnace and communicating with and supplying the fan-blower, the discharge-pipe for the blower communicating with the fire-box of the furnace, and the pipe between the coal-dust receptacle and the discharge-pipe, substantially as herein described.

2. In a coal-dust feeder for furnaces, and in combination with the blower and its discharge-pipe, by which the coal-dust is forced into the fire-box of the furnace, the flaring or fan-shaped nozzles connected with said discharge-pipe and opening through the walls into the fire-box, and the inclined directing-pieces in said nozzles for distributing dust, substantially as described.

3. In combination with a furnace having a fire-box, and its smoke-stack B, the coal-dust feeder therefor, consisting of the receptacle for the coal-dust, the fan-blower, the air-inlet pipe, passing for a portion of its length into the smoke-stack of the furnace and communicating with and supplying the fan-blower, the discharge-pipe from said blower, the branch pipes passing on each side of the fire-box of the furnace, the flaring or fan-shaped nozzles connected with the branch pipes and let through the walls of the fire-box, and the pipe between the coal-dust receptacle and the discharge-pipe, substantially as herein described.

In witness whereof I have hereunto set my hand.

EDMOND PAIT.

Witnesses:
S. H. NOURSE,
H. C. LEE.